US007106858B2

(12) United States Patent  
Goldberg

(10) Patent No.: US 7,106,858 B2  
(45) Date of Patent: Sep. 12, 2006

(54) CARABINER COMMUNICATION DEVICE

(75) Inventor: Edward Goldberg, Teaneck, NJ (US)

(73) Assignee: Forever Green Holdings LLC, Woodbridge, NJ (US)

( * ) Notice: Subject to any disclaimer, the term of this patent is extended or adjusted under 35 U.S.C. 154(b) by 0 days.

(21) Appl. No.: 10/612,332

(22) Filed: Jul. 2, 2003

(65) Prior Publication Data  
US 2005/0002519 A1 Jan. 6, 2005

(51) Int. Cl.  
*H04M 1/00* (2006.01)

(52) U.S. Cl. ..................... 379/450; 379/454
(58) Field of Classification Search ............ 379/446, 379/454, 455, 447, 450; 455/90.3  
See application file for complete search history.

(56) References Cited

U.S. PATENT DOCUMENTS

| 5,270,909 A | 12/1993 | Weiss et al. ............ 362/208 |
| 5,433,339 A | 7/1995 | Sarver ..................... 220/756 |
| 6,223,402 B1 | 5/2001 | Lacy ....................... 24/599.4 |
| D449,968 S | 11/2001 | Reed ......................... D7/622 |
| 6,363,244 B1 | 3/2002 | McGhee .................... 455/90 |
| D459,338 S | 6/2002 | Sterzick .................. D14/196 |
| 6,427,293 B1 | 8/2002 | Bowes, Jr. ................ 24/304 |
| 6,883,694 B1 * | 4/2005 | Abelow ..................... 224/666 |
| 2004/0203501 A1 * | 10/2004 | Johnson et al. ............ 455/90.3 |
| 2004/0205255 A1 | 10/2004 | Joachim |

FOREIGN PATENT DOCUMENTS

| DE | 004310602 | * | 5/1994 | ............ 379/446 |
| JP | 11-41332 | * | 2/1999 | ............ 379/446 |

* cited by examiner

*Primary Examiner*—Benny Q. Tieu  
(74) *Attorney, Agent, or Firm*—Michael R. Gilman; Kaplan Gilman Gibson & Dernier LLP

(57) ABSTRACT

A novel carabiner-type attachment means for personal communication devices is provided. In one embodiment the carabiner-type attachment device extends from the bottom of said communication device. The attachment device is in one embodiment integral with the communication device. Alternate embodiments provide novel means for concealing the carabiner-type attachment device within the body of the communication device.

18 Claims, 13 Drawing Sheets

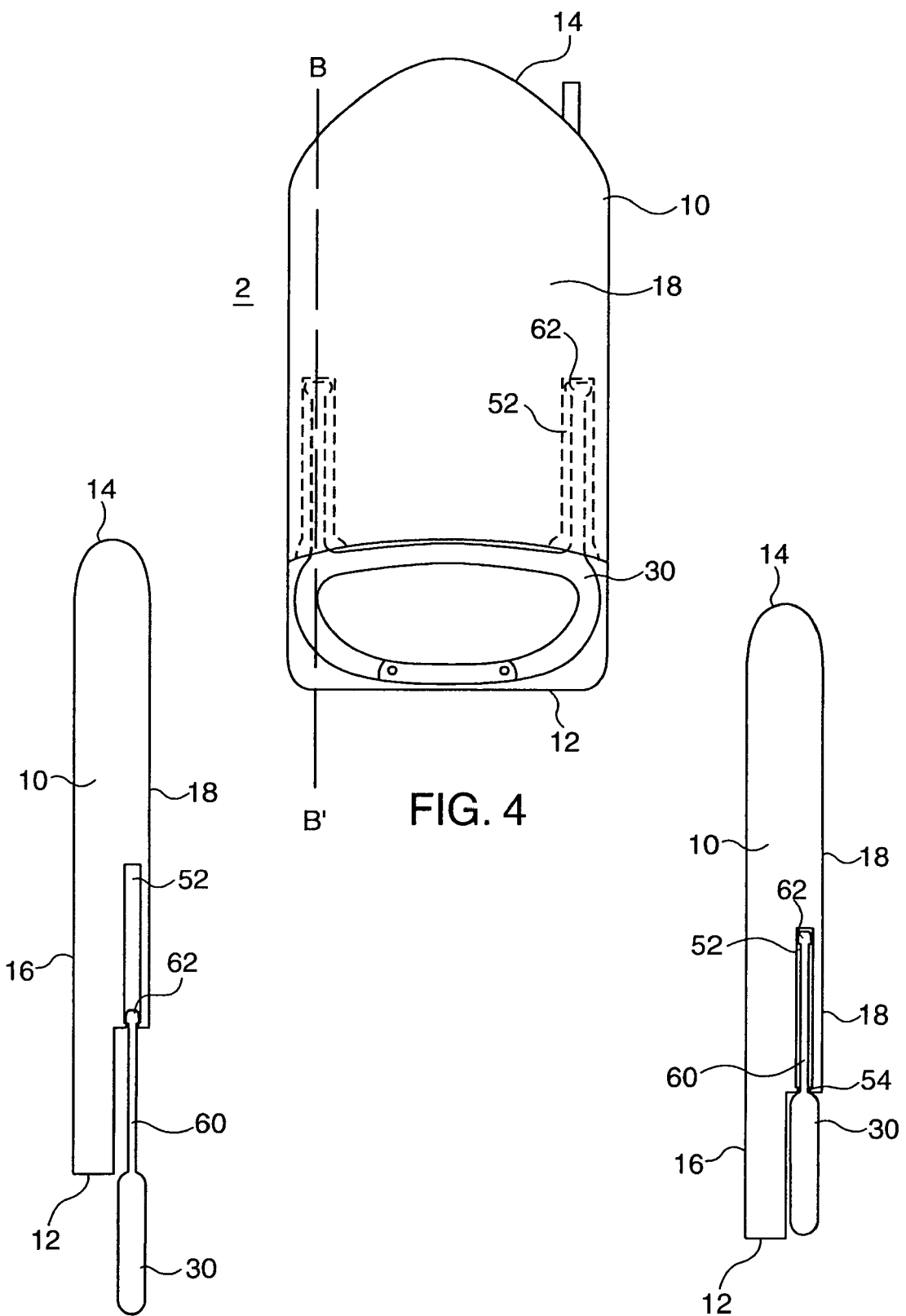

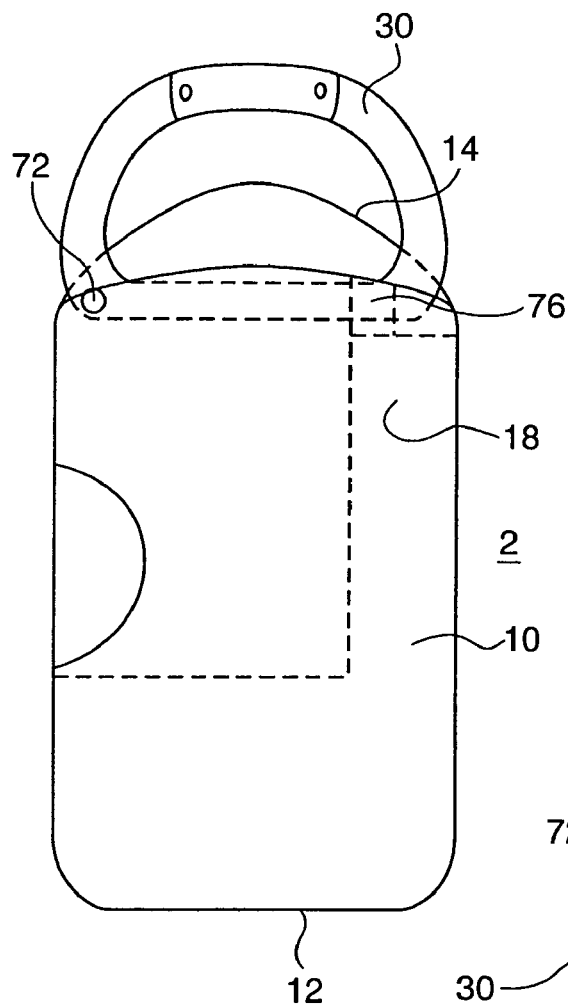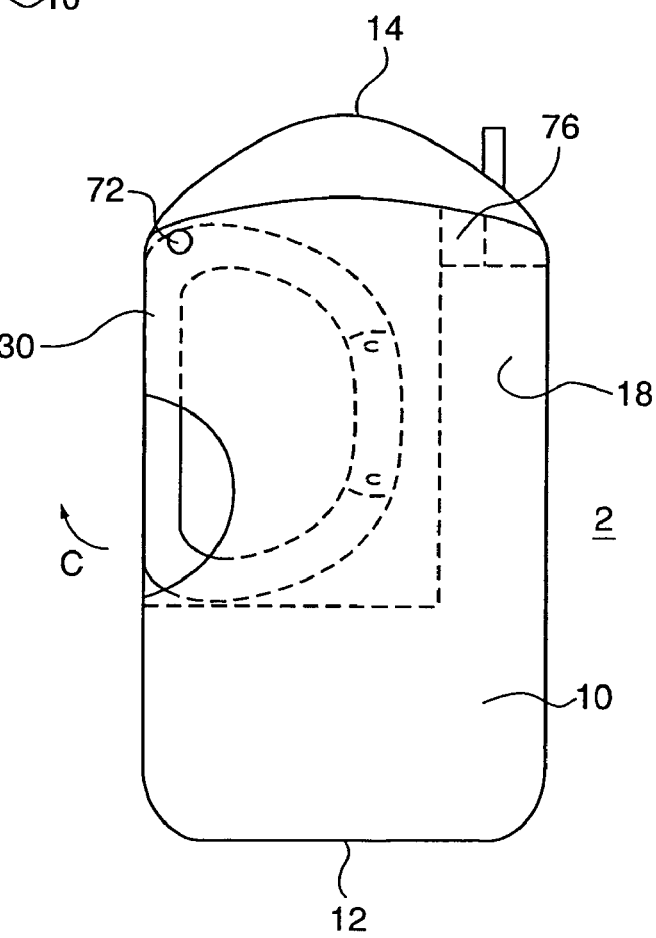
FIG. 5B
FIG. 5C

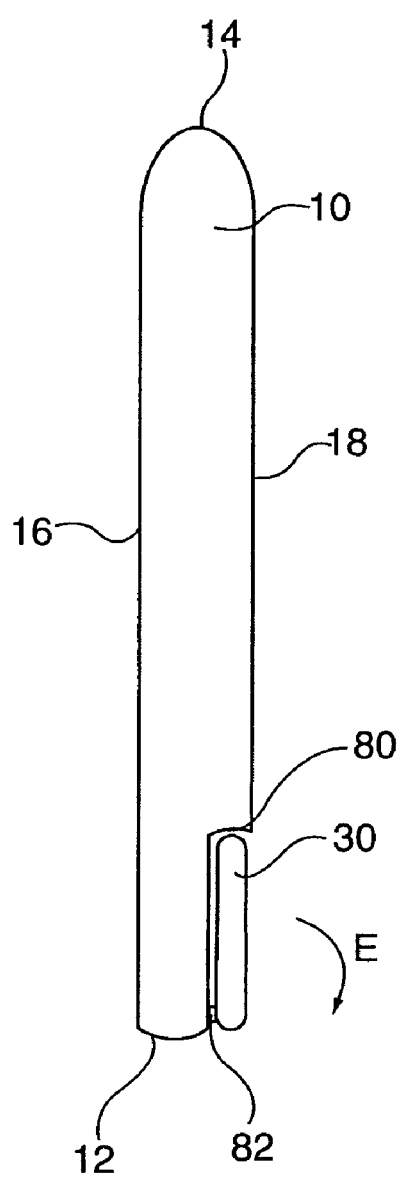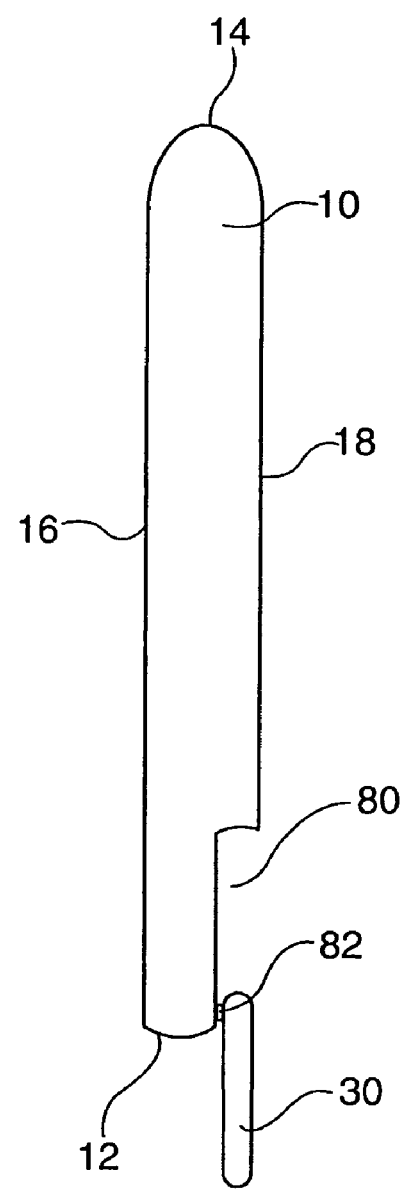
FIG. 6B
FIG. 6C

CARABINER COMMUNICATION DEVICE

FIELD OF THE INVENTION

The invention relates generally to carabiner-type attachment devices adapted to use on portable personal communication devices such as telephone handsets.

BACKGROUND OF THE INVENTION

Carabiners have long been in use for providing a means for attaching articles to each other. Such devices have numerous applications, such as for example enabling multiple articles to be secured to a backpack, purse, handbag, key chain or the like. U.S. Pat. No. 5,005,266 discloses a typical carabiner-type attachment device.

Portable personal communication devices such as cellular telephones, pagers and personal digital assistants (PDAs) are ubiquitous and are considered by many to be indispensable. However, even with advancements directed to reducing the size of these devices often it is inconvenient or undesirable to place these devices in a pocket because they can cause discomfort especially when the device is in a pants pocket and the owner is seated. These devices also tend to create an unsightly lump in any garment in which it is concealed. It is also often the case that a user prefers the device be easily accessible or in sight rather than stowed away in a pocketbook, briefcase or jacket pocket in order to be able to quickly ascertain the identity of a caller or respond to a call. Accordingly it is useful to be able to attach such devices to a garment, strap or bag. Such an adaptation is also desirable to avoid the misplacing of the device. It is commonplace for a cell phone, pager, PDA or the like to be left behind in a car, on the table of a restaurant, on a desk, on a kitchen counter or the like because the device was left out so it could be heard or viewed, only to be forgotten when it came time to leave.

Heretofore communication devices have been equipped with resilient clips for attachment purposes. These clips are not suitable for all applications, however. For instance, such clips are not well suited for securely attaching a communications device to a strap, belt loop or the like because of the tendency of the clip to disengage the article to which it is attached as the communication device is jostled. Most of the time these clips are attached to a case, which in turn contains the cell phone or other device. Where the clip is integral with the device, it is almost inevitable that the clip will break due to stress placed on the clip. In addition, known clips and attachment devices tend to add undesirable bulk to the communication device.

Moreover, when personal communication devices having an attachment device on the top end are attached to and depend from a belt loop the text screen is typically oriented right side up, resulting in an upside down screen when the device is flipped upward to view. This is impractical in many cases U.S. Design Pat. No. 459,338 discloses an ornamental design for a carabiner radio in which the carabiner is integral with the top of the radio. However a radio is simply a device for receiving sound broadcasts and is not subject to the aforementioned considerations. That is, radios are not considered indispensable in our society, they are not items that must be "answered" or viewed periodically to determine callers, etc. Moreover, the attachment to the top of the device results in the aforementioned drawback of upside down text or controls when the device is flipped up to read when attached to a belt loop. In addition the ornamental design of the 459,338 patent does not teach or suggest a carabiner communication device in which a carabiner-type attachment device can be concealed in the body of the communication device until such time as it is needed.

Presently on the market are straps attached to carabiners wherein the strap is adapted to be mounted to a cell phone. These devices are designed to have the carabiner oriented near the top of the cell phone. Such a design is disadvantageous for the aforementioned reasons.

United States Published Patent Application 2002/0173279 discloses a mobile electronic communications device with a housing and an ornament attachment mechanism. The ornament attachment mechanism disclosed is not dimensioned for use as an attachment means for anything other than small ornaments such as earrings, bracelets, necklaces and the like. The disclosed device does not teach or suggest providing a carabiner for a communications device wherein the carabiner is oriented to provide a user an efficient way to attach the communication device to an article of clothing, purse or the like and still be easily readable.

U.S. Pat. No. 6,223,402 discloses a clip for a test telephone. The disclosure relates to an arrangement of a clip so that the clip can be easily engaged to an object to be hooked. This device relates to a test phone for telephone workers and does not address the concerns relating to a personal communication device mentioned hereinabove.

Therefore it would be a considerable advantage to be able to securely and selectively attach the communication device to an article such as a belt or belt loop in a manner that enables a user to easily read text on a message screen of the device. It would also be an advantage in that it would permit the secure, attractive and comfortable carriage of the device without the need to place the device in the pocket of a garment. It would also be advantageous for a personal communication device to be provided with a carabiner-type attachment device that could be concealed within the body of the device when not in use.

SUMMARY OF THE INVENTION

The present invention provides novel carabiner-type attachment means for personal communication devices. In one embodiment the carabiner-type attachment device extends from the bottom of said communication device. The attachment device is in one embodiment integral with the communication device. Alternate embodiments provide novel means for concealing the carabiner-type attachment device within the body of the communication device.

OBJECTS OF THE INVENTION

It is an object of the present invention to provide a carabiner-type attachment for a communication device.

It is another object of the present invention to provide a carabiner-type attachment for a communication device wherein the carabiner-type attachment device is integral with the communication device.

It is another object of the present invention to provide a carabiner-type attachment for a communication device wherein the carabiner-type attachment device extends from the bottom end of the communication device.

It is another object of the present invention to provide a carabiner-type attachment for a communication device wherein the carabiner-type attachment device is detachably connected to the communication device.

It is another object of the present invention to provide a carabiner-type attachment for a communication device wherein the carabiner-type attachment device is in one position concealed within said communication device and also extendible from said communications device.

It is a further object of the present invention to provide a carabiner-type attachment for a communication device wherein the carabiner-type attachment permits safe and secure attachment of the writing instrument to luggage, belt loops, towel racks, wall hooks, utility belts, backpacks and the like.

BRIEF DESCRIPTION OF THE DRAWINGS

FIG. 4 is a back view of another preferred embodiment of the present invention;

FIG. 4A is a side cross sectional view of the embodiment of FIG. 4 taken through line B–B';

FIG. 4B is a side cross sectional view of the embodiment of FIG. 4 taken through line B–B' when the attachment device is in an open position;

FIG. 5B is a back view of another preferred embodiment of the present invention;

FIG. 5C is a back view of the preferred embodiment of the present invention as shown in FIG. 5B;

FIG. 6B is a side cross sectional view of the embodiment of FIG. 6 taken through line D–D';

FIG. 6C is a side cross sectional view of the embodiment of FIG. 6A taken through line D–D' when the attachment device is in an open position;

DETAILED DESCRIPTION OF THE PREFERRED EMBODIMENT

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1:
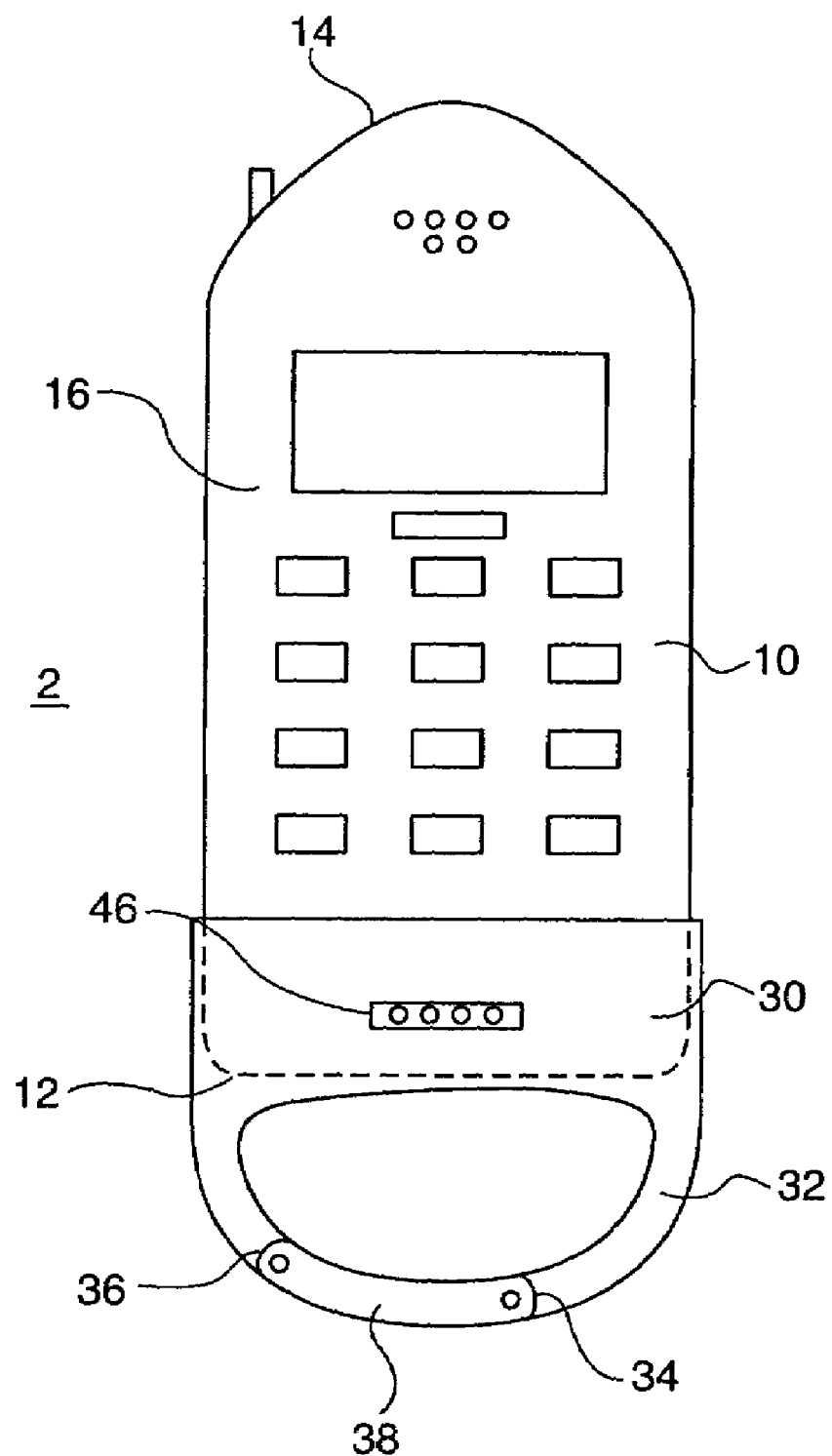
FIG. 1 is a front view of a preferred embodiment of the invention.
Figure 1A:
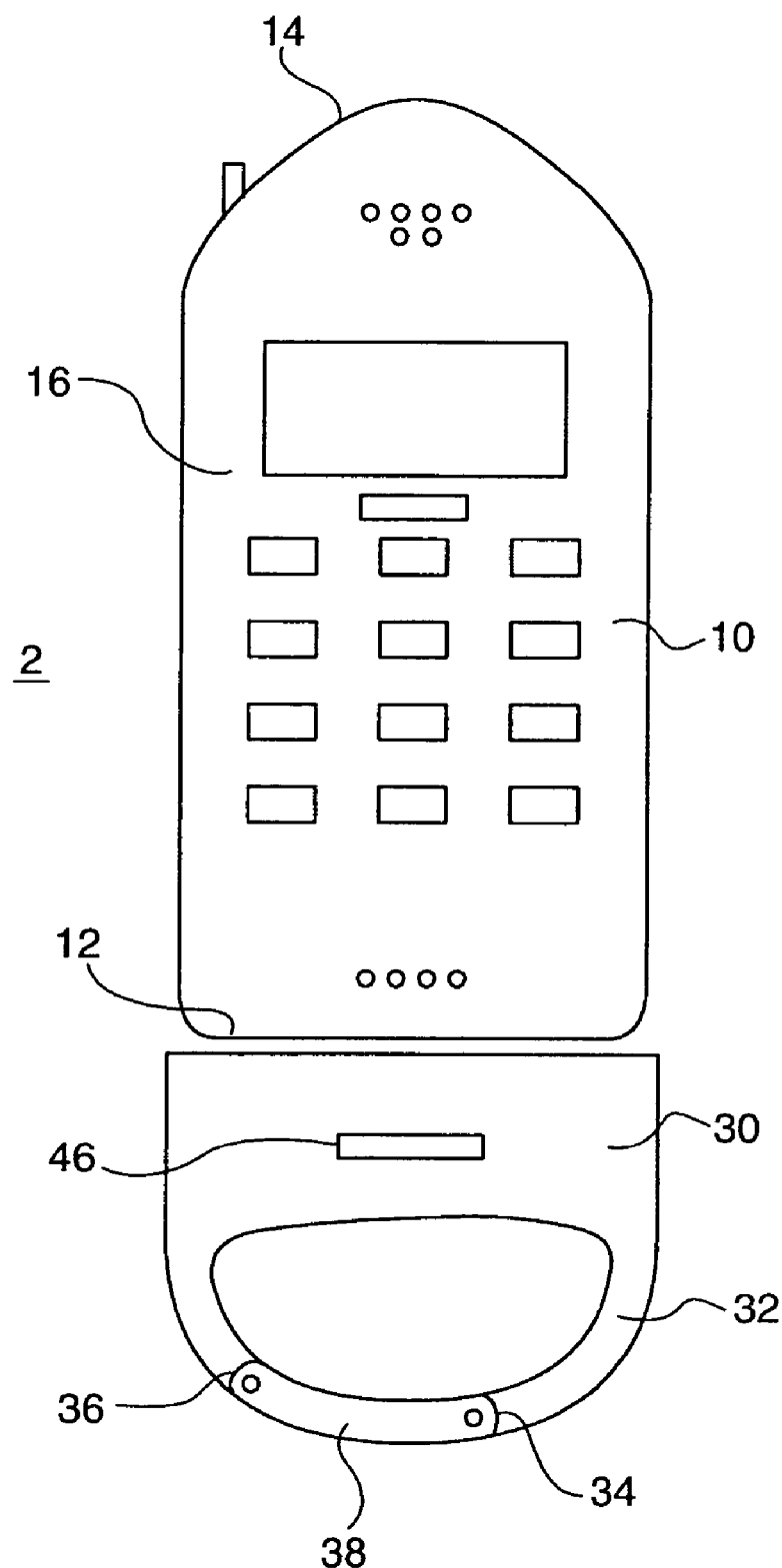
FIG. 1A is a front exploded view of the preferred embodiment of FIG. 1.

Now referring to FIGS. 1 and 1A a preferred embodiment of the device 2 comprises essentially a communication device 10 and at least one attachment device 30. Communication device 10 may comprise any suitable communication device including but not limited to a cellular telephone, pager, PDA or the like as are well known in the art. Communication device 10 comprises a bottom end 12, a top end 14, a front side 16 and a back side 18.

Attachment device 30 comprises at least one body member 32 and one openable gate member 38. Now referring to FIG. 1 in a preferred embodiment body member 32 comprises at least a first elongated section comprising a first end 34 and a second end 36 and is typically fabricated of any material suitable for attachment devices such as but not limited to bare or coated metal, wood, rubber, plastic, combinations thereof or any other suitable material as is well known in the art. In a preferred embodiment gate member 38 comprises an elongated member pivotably attached at one end to an end 34 or 36 of said body member 32. The other end of gate member 38 contacts or is in close proximity to the other end 34 or 36 of said body member 32 when said gate 38 is in a closed position. In a preferred embodiment gate member 38 is inwardly openable. Gate member 38 is fabricated of any suitable material as recited above for body member 32, but does not necessarily need to be of the same material as that of body member 32. Gate member 38 may be separately molded and attached to body member 32 by means of a pin or other means well known in the art. In a preferred embodiment body member 32 is curvilinear. In a most preferred embodiment attachment device 30 is formed in the shape of a carabiner but other shapes are contemplated by the present invention.

In another embodiment (not shown) attachment device 30 may comprise one elongated section extending from said communication device 10, wherein gate member 38 is pivotably attached to said communication device 10.

Figure 1B:
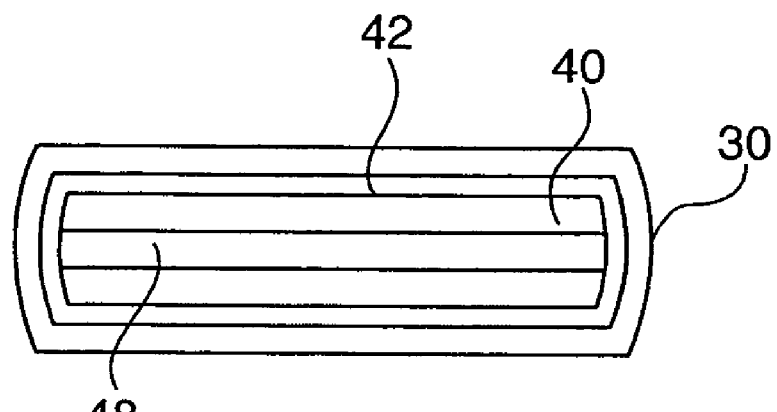
FIG. 1B is a top plan view of a preferred embodiment of the attachment device of FIG. 1A.
Figure 1C:
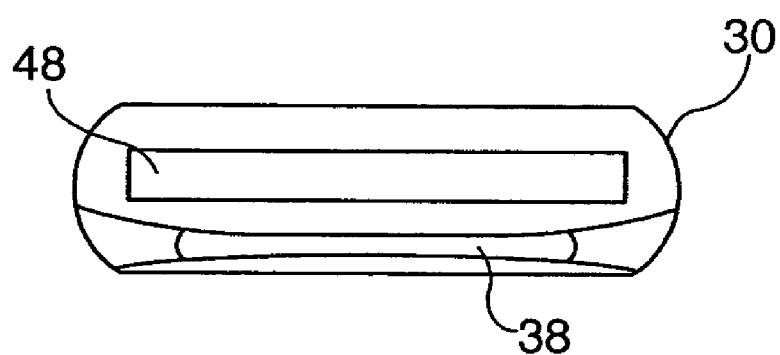
FIG. 1C is a bottom plan view of a preferred embodiment of the attachment device of FIG. 1A.
Figure 1D:
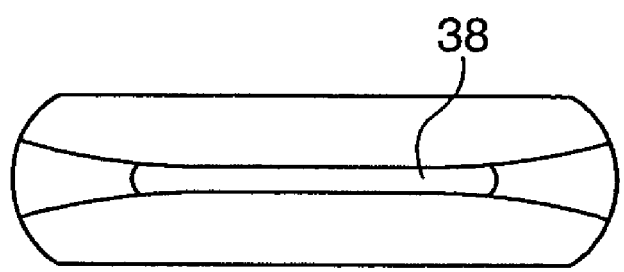
FIG. 1D is a bottom view of a further preferred embodiment of the attachment device of FIG. 1A.
Figure 1E:
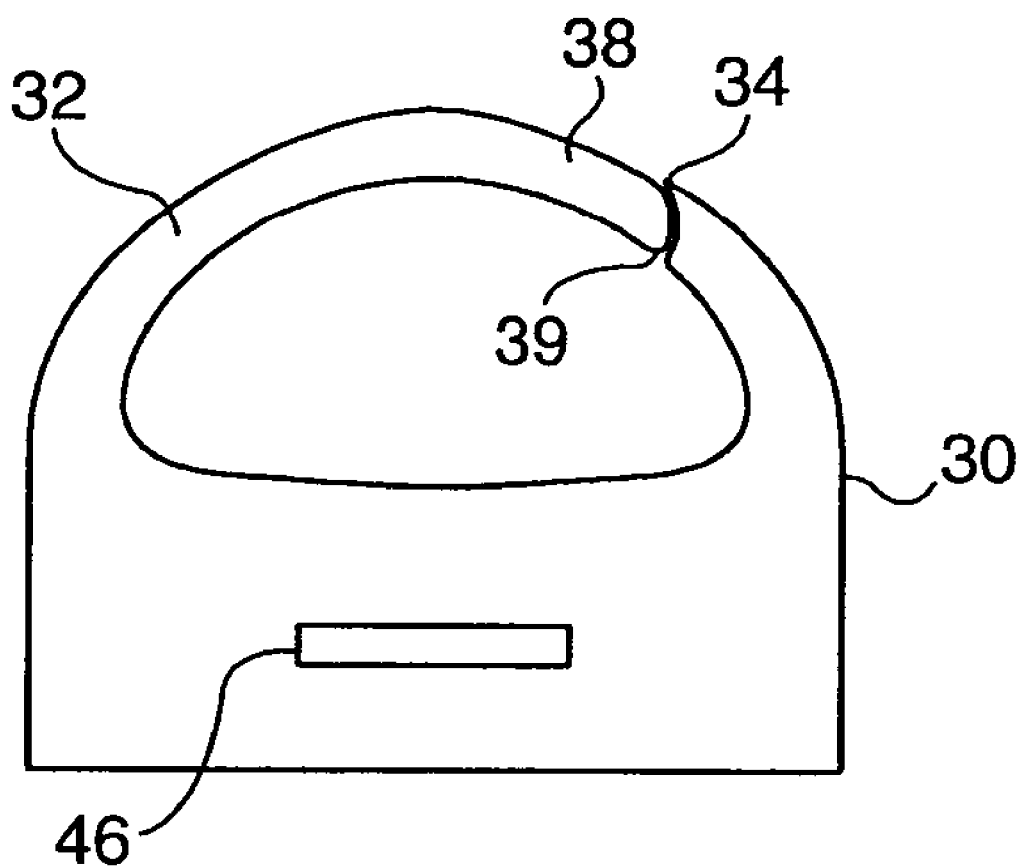
FIG. 1E is a front view of a preferred embodiment of the attachment device of the present invention.

Now referring to FIG. 1E, in one embodiment body member 32 comprises an elongated section comprising at least a first end 34. Gate member 38 comprises an elongated member integrally attached to said body member 32 and the integral body 32 and gate member 38 are fabricated of a resilient material such as but not limited to rubber, plastic, thin metal or any other suitable resilient material as is well known in the art. A first end 39 of gate member 38 contacts or is in close proximity to an end 34 of said body member 32 when said gate 38 is in a closed position. In this embodiment a resilient attachment device is formed without a pivoting hinge. The gate member 38 simply deforms when pressure is applied and resiliently returns to its original position when pressure is released. In a most preferred embodiment attachment device 30 is formed in the shape of a carabiner but other shapes are contemplated by the present invention.

Figure 1F:
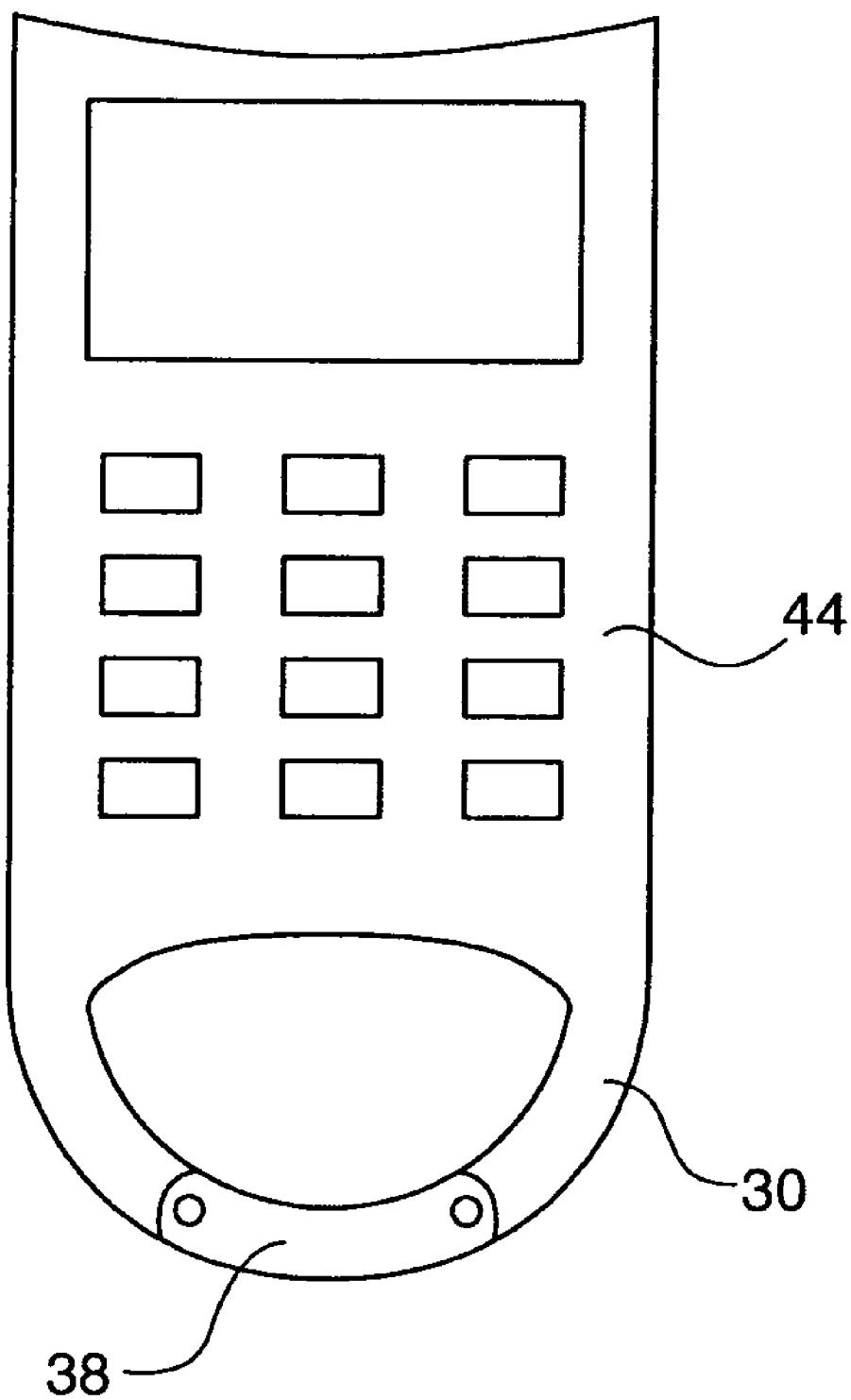
FIG. 1F is a front view of a most preferred embodiment of the attachment device of the present invention.

Now referring to FIGS. 1–1F in a preferred embodiment attachment device 30 is adapted to be removably attachable to communication device 10. Attachment device 30 is provided with a means for removably connecting attachment device 30 to communication device 10. Now referring to FIG. 1B attachment device 30 comprises an opening 40 opposite gate member 38 for receiving bottom end 12 of communication device 10. In a most preferred embodiment the opening 40 of attachment device 30 further comprises an interior lining 42 such as but not limited to a rubber lining which securely engages, such as by friction, the outer surface of communication device 10. Lining 42 may optionally be a Velcro® lining adapted to engage a complementary Velcro® surface attached to said communication device 10. Other means of releasably attaching said attachment device 30 to said communication device 10 include but are not limited to a clip-on means, such as for example at least one clip engagable to at least one lip disposed on said communication device.

Now referring to FIG. 1F, in a most preferred embodiment the means for removably connecting attachment device 30 to communication device 10 comprises a face plate 44 detachable from said communication device 10 extending from said attachment device 30. Detachable face plate 44 may be any detachable face plate known in the art such as but not limited to those typically sold aftermarket to provide a user the ability to change the outward appearance of the communication device.

Now referring to FIGS. 1 and 1A, in a most preferred embodiment attachment device 30 further comprises opening 46 that is oriented over the mouthpiece of a communication device when attachment device 30 is attached to said communication device 10. Now referring to FIGS. 1B and 1C attachment device further comprises opening 48 to provide accessibility to the jacks (not shown) typically present on communication devices. Gate member 38 may be offset to provide easy access to said jacks through opening 48 when attachment device 30 is engaged to communication device 10 according to this embodiment.

The figures depict an embodiment in which attachment device 30 is receivable on the bottom end 12 of communication device 10 however it is contemplated the attachment device may be adapted to be attached to the top end 14 of said communication device 10.

Figure 2:
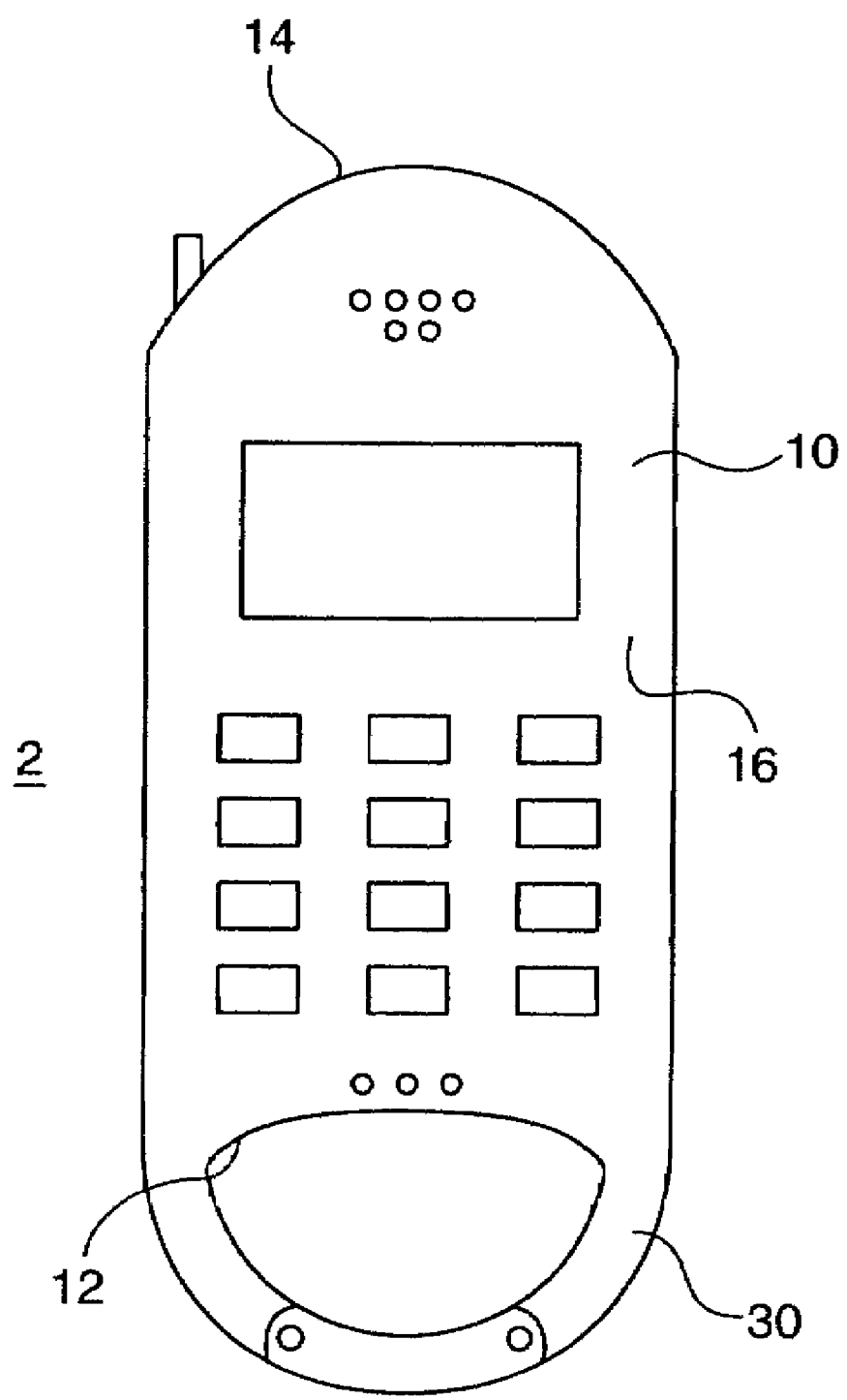
FIG. 2 is a front view of another preferred embodiment of the present invention.

Now referring to FIG. 2, in an alternate preferred embodiment attachment device 30 is integrally formed with communication device 10. Such integral embodiment may be achieved by any means known in the art appropriate for the material employed in construction of the device 2, such as for example molding where said attachment device 30 is fabricated of plastic.

Figures 3, 3A, 3B:
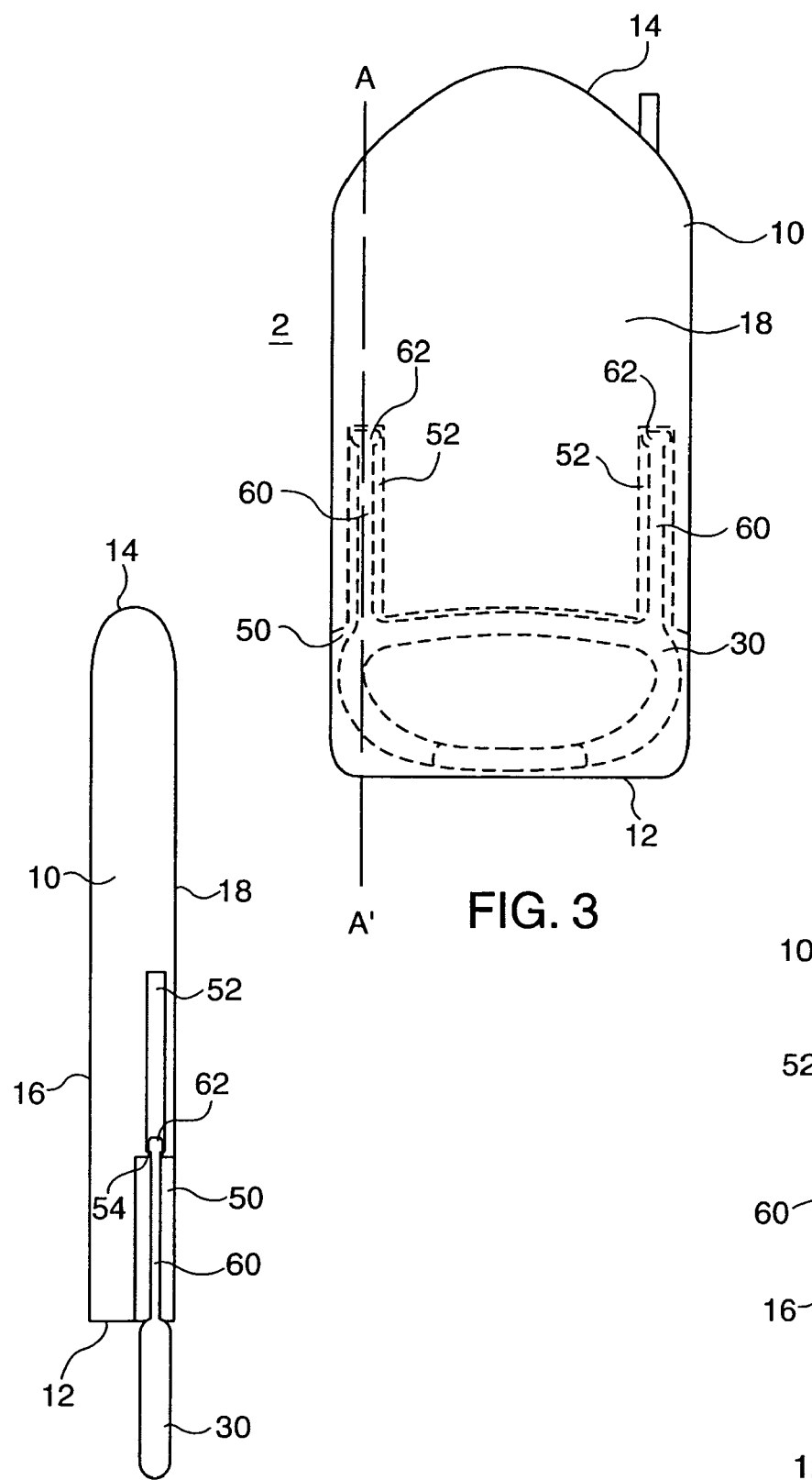
FIG. 3 is a back view of another preferred embodiment of the present invention.
FIG. 3A is a side cross sectional view of the embodiment of FIG. 3 taken through line A–A'.
FIG. 3B is a side cross sectional view of the embodiment of FIG. 3 taken through line A–A'.
Figure 3C:
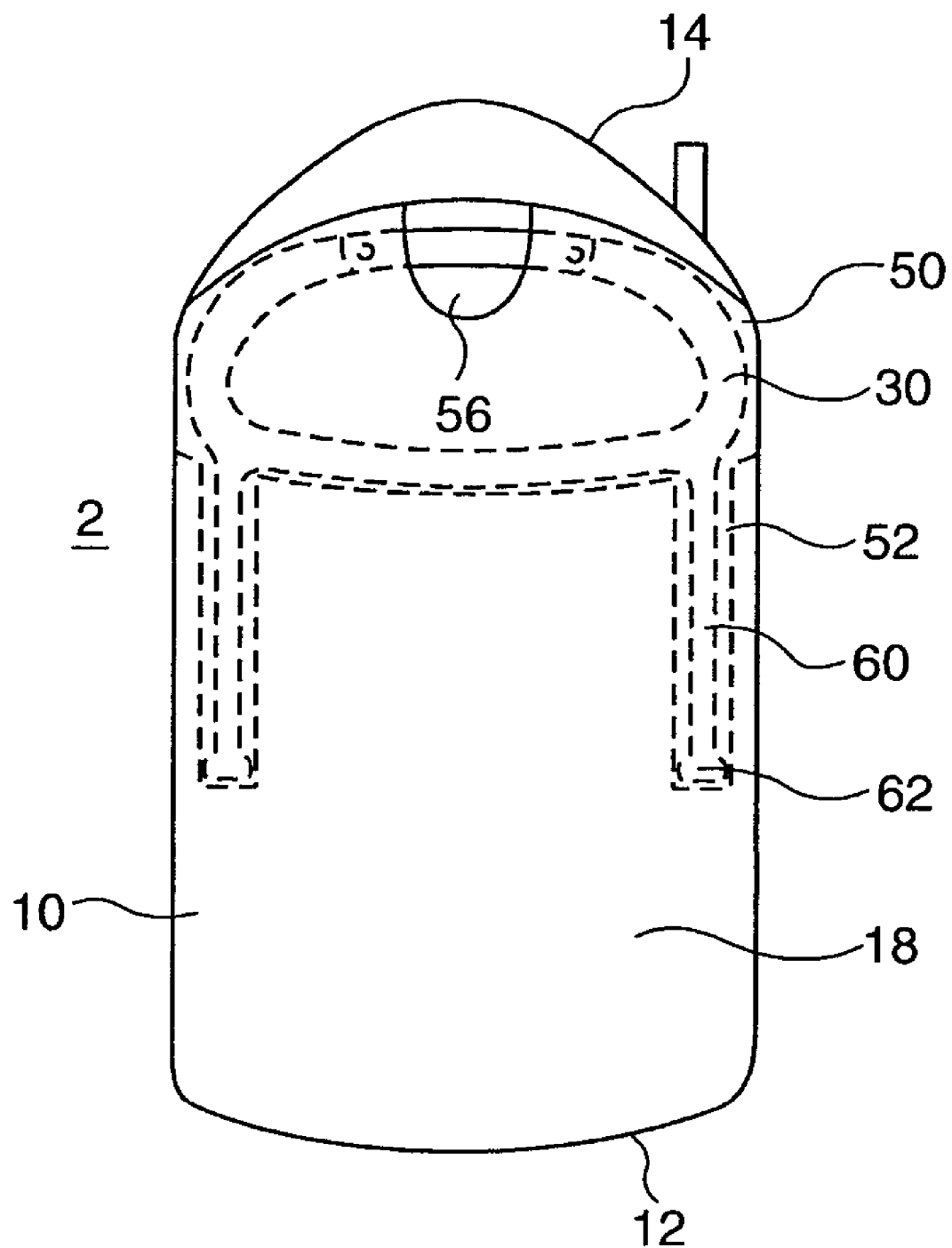
FIG. 3C is a back view of yet another preferred embodiment of the present invention.

Now referring to FIGS. 3–3C in an alternate preferred embodiment attachment device 30, formed in substantially the same manner as described heretofore with respect to FIGS. 1–2, is extendible from communication device 10. Attachment device 30 is secured in a cavity 50 formed in communication device 10. Engagement rails 60 extend from attachment device 30 and are slidably engaged in channels 52 formed in said communication device. Rails 60 preferably comprise means such as but not limited to enlarged ends 62 for preventing disengagement of said rails 60 with channels 52 when said attachment means is extended from said communication device 10. Channels 52 may comprise a lip 54 to engage said enlarged end 62 to prevent disengagement. Attachment means 30 may be extended from a nested position within said communication device 10 by a flick of the wrist or optionally, referring to FIG. 3C (showing the attachment device extendible from the top portion 14 of the communication device 10), a cutout 56 may be formed in the back side 18 of said communication device 10 so that attachment device 30 may be manually extended. Alternatively attachment means 30 may include a means for extending the attachment device 30 such as a tab or flange (not shown) that may be grasped by a user. Preferably said cavity 50 and channels 52 are formed toward the back portion 18 of the communication device 10 to avoid interference with the electronics disposed closer to the front face 16 of the communication device 10. While this embodiment of the present invention (as well as that of FIGS. 4–4B) depicts two rails 60 it is contemplated that a single or multiple rails 60 may be employed. In addition, channel 52 may comprise many forms and the means for preventing disengagement of rails 60 may likewise take many forms as will be apparent to those having ordinary skill in the art.

Now referring to FIGS. 4–4B in a preferred embodiment the section of back portion 18 of communication device 10 that conceals attachment device 30 within chamber 50 when attachment device 30 is not extended in FIGS. 3–3C is removed, eliminating chamber 50 and leaving attachment device 30 exposed even when not extended from said communication device. In this way attachment device 30 nests snugly in a recess against communication device 10. In this embodiment attachment device 30 may also be adapted to extend from top portion 14.

Figure 5:
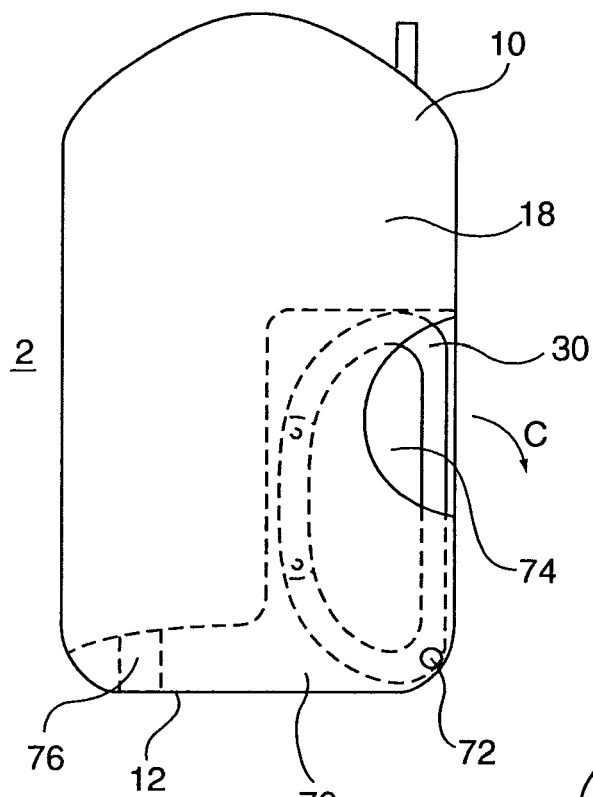
FIG. 5 is a back view of a further embodiment of the present invention.
Figure 5A:
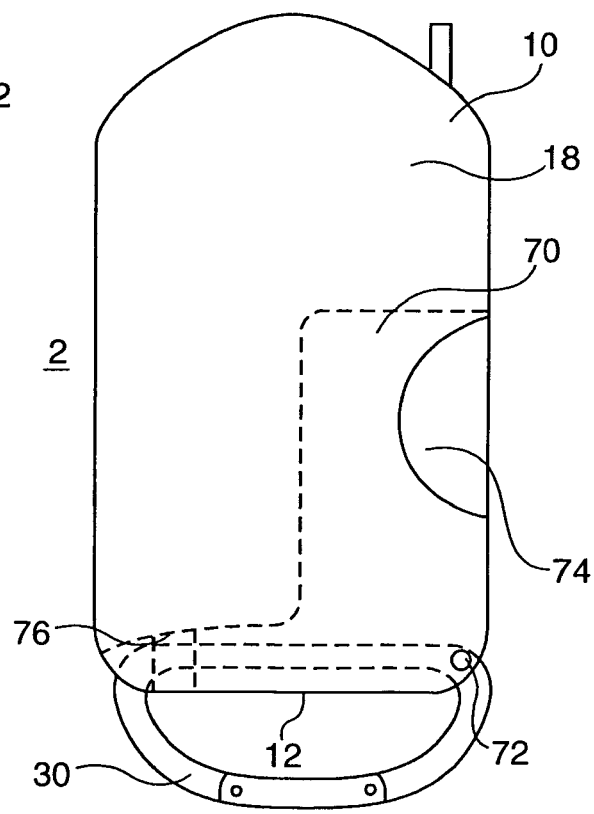
FIG. 5A is a back view of the present invention as shown in FIG. 5.

Now referring to FIGS. 5–5C in an alternate preferred embodiment attachment device 30, again formed in substantially the same manner as described heretofore with respect to FIGS. 1–2, is rotatably extendible from communication device 10. Attachment device 30 is secured in a cavity 70 formed in communication device 10. Alternatively, similar to the embodiment of FIGS. 4–4B a section of back portion 18 may be removed or not included. In this way attachment device 30 nests snugly in a recess against communication device 10. Attachment device 30 is engaged to said communication device by spindle 72. If a section of back portion 18 is present covering at least a portion of said attachment device 30, cutout 74 is provided so that a user can access attachment device 30 and rotatably move said device in the direction of arrow C. Alternatively, attachment device 30 may comprise a tab or flange (not shown) as discussed hereinabove that may be grasped by a user to rotatably move said attachment device 30 from its nested position. Attachment device 30 is rotatable proximal the bottom 12 (FIGS. 5 and 5A) or top 14 (FIGS. 5B and 5C) of communication device 10 and engaged to engagement means 76. Engagement means 76 can be any device adapted to retain attachment device 30 in a fixed position such as but not limited to a clip. Where engagement means 76 is a clip it is preferably formed of a resilient material so that attachment device 30 can be easily disengaged using manual force. Engagement means 76 is adapted so that attachment device 30 will not be disengaged during normal use. Alternatively engagement means 76 may be another engagement means known to those having ordinary skill in the art. In yet a further alternative, the user of the device 2 can opt out of using the engagement means 76 and simply allow attachment device 30 to freely swing around spindle 72.

Figure 6:
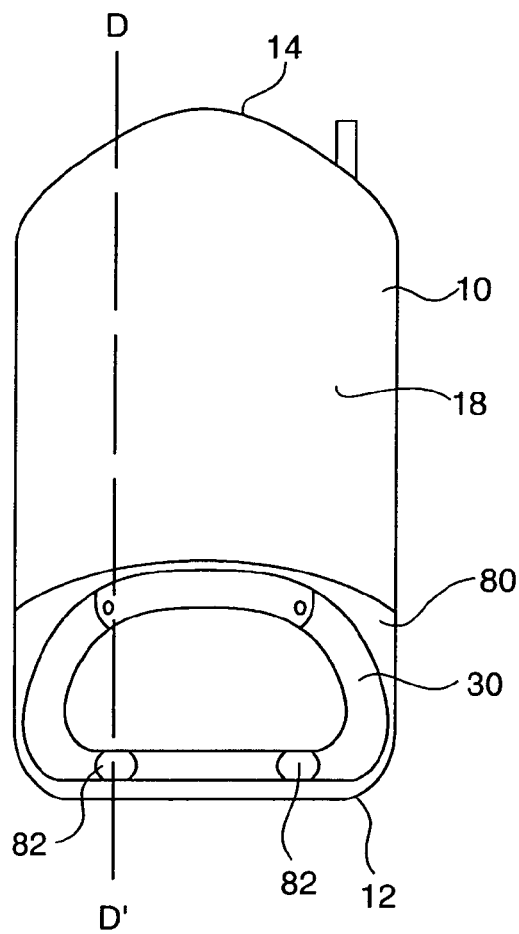
FIG. 6 is a back view of another preferred embodiment of the present invention.
Figure 6A:
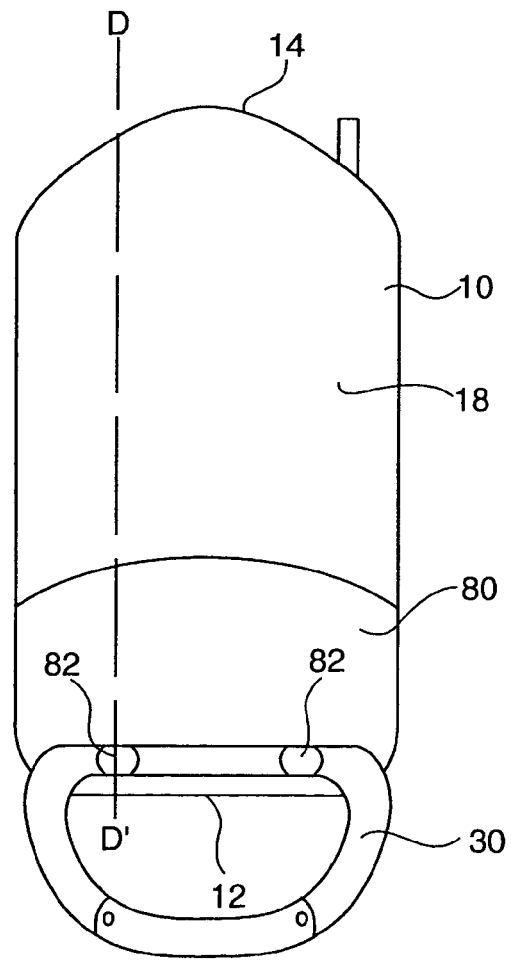
FIG. 6A is a back view of the preferred embodiment of the present invention according to FIG. 6 when the attachment device is in an open position.

Now referring to FIGS. 6–6C in yet a further alternate preferred embodiment attachment device 30 is rotatably extendible from communication device 10. Attachment device 30 is rotatably secured in a recess 80 formed in communication device 10. As best seen in FIGS. 6 and 6B, in the closed position attachment device 30 preferably nests snugly in recess 80 against communication device 10, thereby maintaining a smooth outer profile of device 2. Attachment device 30 is engaged to said communication device by rotatable attachment means 82. Now referring to FIGS. 6B and 6C attachment device 30 is rotatably movable outwardly from said communication device 10 in the direction of arrow E such that in a fully opened position (FIG. 6C) attachment device 30 is extended from and oriented in substantially the same plane as communication device 10 and proximal the bottom 12 (FIGS. 6–6C) or top 14 (not shown) of communication device 10. Optionally, known engagement means (not shown) may be employed to retain attachment device 30 fixed in either an open or closed position.

While the preferred embodiments have been described and illustrated it will be understood that changes in details and obvious undisclosed variations might be made without departing from the spirit and principle of the invention and therefore the scope of the invention is not to be construed as limited to the preferred embodiment.

What is claimed is:

1. A device comprising a communication device comprising front and back sides and top and bottom ends and at least one attachment device engaged with said communication device, said attachment device comprising at least one selectively openable gate member for allowing said device to be selectively, removably attached to another item and at least one rail extending from said attachment device, said attachment device being selectively slidably extendible from and selectively slidably retractable into said communication device through said bottom end of said communication device, said selective slidability achieved through communication of said at least one rail in a channel in said communication device.

2. The device according to claim 1 said attachment device comprising a carabiner.

3. The device as recited in claim 1, said at least one rail having an enlarged end and said channel having a lip to engage said enlarged end of said at least one rail when said attachment device is in said extended state to prevent said at least one rail from disengaging from said channel.

4. The device as recited in claim 1, said at least one rail comprising first and second rails, said first rail communicating with said channel and said second rail communicating with another channel in said communication device.

5. The device as recited in claim 4, said first and second rails each having an enlarged end and said channel and said another channel each having a lip to engage said enlarged ends of said first and second rails when said attachment device is in said extended state to prevent said rails from disengaging from said channels.

6. The device as recited in claim 1, said attachment device being extendable from and retractable into a cavity formed in said communication device.

7. The device as recited in claim 6, wherein said attachment device is substantially concealed within said cavity when in said retracted state.

8. The device as recited in claim 6, wherein said attachment device is not concealed when in said retracted state within said cavity.

9. The device as recited in claim 1, said attachment device having the general appearance of a carabiner.

10. A device comprising a communication device comprising front and back sides and top and bottom ends and at least one attachment device engaged with said communication device, said attachment device comprising at least one selectively openable gate member for allowing said device to be selectively, removably attached to another item and at least one rail extending from said attachment device, said attachment device being telescopingly extendible from and retractable into said communication device through said bottom end of said communication device, said telescopability achieved through communication of said at least one rail in a channel in said communication device.

11. The device as recited in claim 10, said attachment device having the general appearance of a carabiner.

12. The device as recited in claim 10, said attachment device comprising a carabiner.

13. The device as recited in claim 10, said at least one rail having an enlarged end and said channel having a lip to engage said enlarged end of said at least one rail when said attachment device is in said extended state to prevent said at least one rail from disengaging from said channel.

14. The device as recited in claim 10, said at least one rail comprising first and second rails, said first rail communicating with said channel and said second rail communicating with another channel in said communication device.

15. The device as recited in claim 14, said first and second rails each having an enlarged end and said channel and said another channel each having a lip to engage said enlarged ends of said first and second rails when said attachment device is in said extended state to prevent said rails from disengaging from said channels.

16. The device as recited in claim 10, said attachment device being extendable from and retractable into a cavity formed in said communication device.

17. The device as recited in claim 16, wherein said attachment device is substantially concealed within said cavity when in said retracted state.

18. The device as recited in claim 16, wherein said attachment device is not concealed when in said retracted state within said cavity.

* * * * *